US006473790B1

(12) United States Patent
Tagi

(10) Patent No.: US 6,473,790 B1
(45) Date of Patent: Oct. 29, 2002

(54) NETWORK SYSTEM FOR SERVING INFORMATION TO MOBILE TERMINAL APPARATUS

(75) Inventor: Minoru Tagi, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/155,001

(22) PCT Filed: Feb. 6, 1998

(86) PCT No.: PCT/JP98/00491
§ 371 (c)(1),
(2), (4) Date: Sep. 14, 1998

(87) PCT Pub. No.: WO98/35333
PCT Pub. Date: Aug. 13, 1998

(30) Foreign Application Priority Data

Feb. 7, 1997 (JP) .............................................. 9-025245
May 15, 1997 (JP) .............................................. 9-125835

(51) Int. Cl.[7] ........................ G06F 15/16; G06F 15/167
(52) U.S. Cl. ........................ 709/216; 709/219; 709/217; 701/202; 701/209; 705/5; 705/6; 707/10; 455/457
(58) Field of Search ................................. 709/245, 246, 709/244, 203, 217, 219, 216, 226; 340/825.49; 455/433, 440, 456, 457; 707/1, 2, 3, 4, 5; 370/313; 701/200, 1, 201, 203, 202, 207, 213

(56) References Cited

U.S. PATENT DOCUMENTS

| | | | | |
|---|---|---|---|---|
| 4,247,908 A | * | 1/1981 | Lockhart et al. ............. | 709/245 |
| 5,339,239 A | * | 8/1994 | Manabe et al. ................ | 705/1 |
| 5,508,917 A | | 4/1996 | Siegle et al. | |
| 5,724,520 A | * | 3/1998 | Goheen .......................... | 705/1 |
| 5,758,332 A | * | 5/1998 | Hirotani ........................ | 707/1 |

(List continued on next page.)

FOREIGN PATENT DOCUMENTS

| | | |
|---|---|---|
| JP | 63-094388 | 4/1988 |
| JP | 01-219949 | 9/1989 |
| JP | 06-266975 | 9/1994 |
| JP | 07-212271 | 8/1995 |
| JP | 08-147372 | 6/1996 |
| JP | 09-081804 | 3/1997 |
| WO | WO 90/02391 | 3/1990 |
| WO | WO 92/10824 | * 6/1992 |
| WO | WO 93/20546 | * 10/1993 |

OTHER PUBLICATIONS

R. Tomkewitsch; "Dynamic Route Guidance and Interactive Transport Management with ALI–SCOUT"; 1991, pp. 45–50; IEEE Transactions on Vehicular Technology, Feb. 1991, No. 1.

Patent Abstracts of Japan vol. 14, No. 274; Jun. 13, 1990, & JP 02 079200 (Hitachi Ltd.), Mar. 19, 1990.

(List continued on next page.)

Primary Examiner—Mehmet B. Geckil
Assistant Examiner—William C. Vaughn, Jr.
(74) Attorney, Agent, or Firm—Frishauf, Holtz, Goodman & Chick, P.C.

(57) ABSTRACT

An information serving system includes a mobile apparatus and a terminal apparatus. The mobile apparatus includes a memory which stores ticket information including departure time data, and a display. The terminal apparatus is installed in a building, and includes a communication device, a database, and a controller. The controller controls the communication device to read the ticket information stored in the memory of the mobile apparatus, calculates a time interval between a current time and a departure time represented by the departure time data, retrieves usable facility information from the database in accordance with a length of the time interval, and causes the communication device to transmit to the mobile apparatus the retrieved usable facility information together with map information. The mobile apparatus then controls its display to display the transmitted usable facility information on a map based on the transmitted map information.

14 Claims, 14 Drawing Sheets

U.S. PATENT DOCUMENTS

| | | | | | |
|---|---|---|---|---|---|
| 5,765,122 | A | * | 6/1998 | Nagai et al. | 340/944 |
| 5,832,394 | A | * | 11/1998 | Wortham | 701/1 |
| 5,944,768 | A | * | 8/1999 | Ito et al. | 701/200 |
| 5,948,040 | A | * | 9/1999 | DeLorme et al. | 701/201 |
| 5,964,821 | A | * | 10/1999 | Brunts et al. | 701/201 |
| 6,029,110 | A | * | 2/2000 | Zuber et al. | 701/200 |
| 6,038,562 | A | * | 3/2000 | Anjur et al. | 707/10 |
| 6,039,624 | A | * | 3/2000 | Holems | 445/403 |
| 6,073,075 | A | * | 6/2000 | Kondou et al. | 701/203 |
| 6,122,520 | A | * | 9/2000 | Want et al. | 455/456 |
| 6,134,534 | A | * | 10/2000 | Walker et al. | 705/26 |
| 6,138,072 | A | * | 10/2000 | Nagai | 340/988 |
| 6,144,848 | A | * | 11/2000 | Walsh et al. | 235/379 |
| 6,233,506 | B1 | * | 5/2001 | Obradovich et al. | 701/1 |
| 6,385,622 | B2 | * | 5/2002 | Bouve et al. | 701/208 |

OTHER PUBLICATIONS

Patent Abstracts of Japan vol. 097, No. 001, Jan. 31, 1997, & JP 08 235495 (Aqueous Res:KK); Sep. 13, 1996.

Patent Abstracts of Japan vol. 096, No. 009 Sep. 30, 1996, & JP 08 124084 A (Space Atsupu:KK); May 17, 1996.

Patent Abstracts of Japan vol. 016, No. 220 (P–1358) May 22, 1992 & JP 04 043481 A (Seiko Instr. Inc.) Feb. 13, 1992.

* cited by examiner

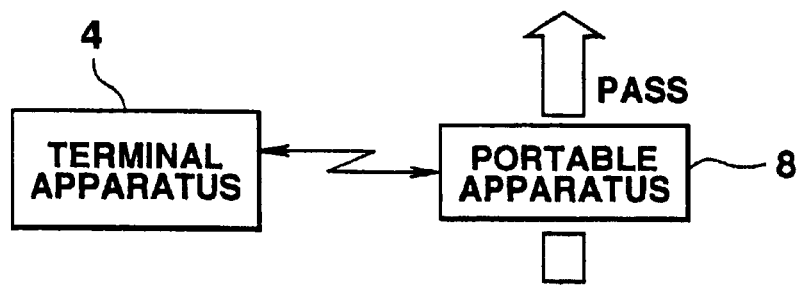
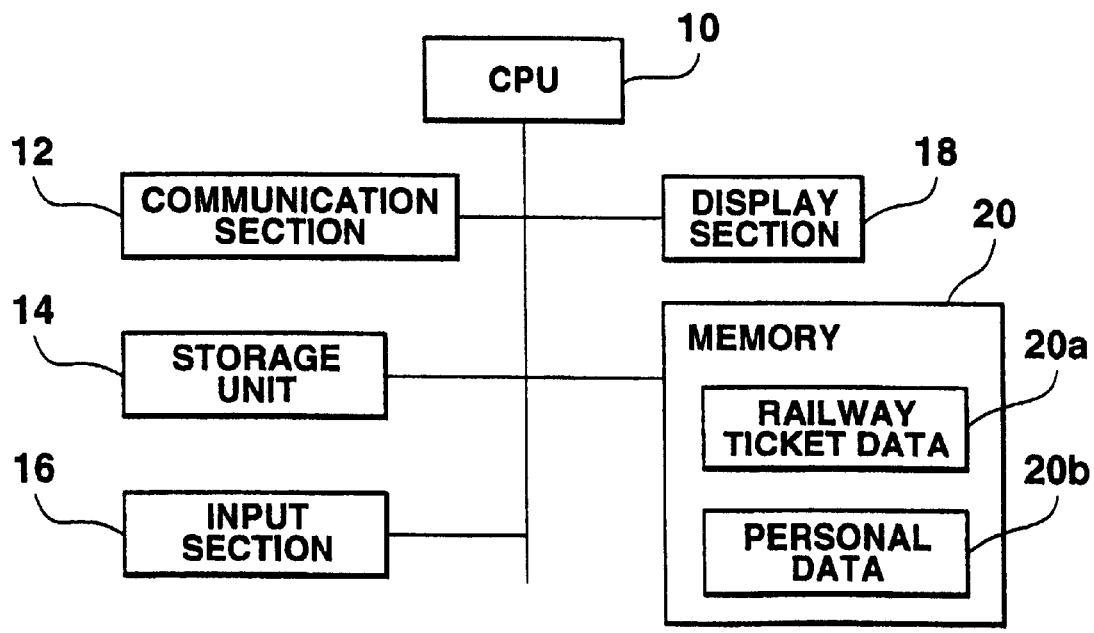

| NAME | TELEPHONE NO. | ADDRESS | FAVORITE FOOD | HOBBY |
|---|---|---|---|---|
| A | ××× | ××× | SUSHI | SKIING |
| B | ××× | ××× | CRAB | BASEBALL |
| C | ××× | ××× | ITALIAN FOOD | PAINTING |

| SHOP'S NAME | PLACE | MENU | KIND OF CUISINE | OPEN HOURS |
|---|---|---|---|---|
| RESTAURANT A | ××TOWN, ×PREFECTURE | | ITALIAN | 24 HOURS |
| SUSHI RESTAURANT | ××,×CITY | | JAPANESE | 11 TO 22 |
| CURRY SHOP | ××,×CITY | | INDIAN | 10 TO 20 |
| | | | | |

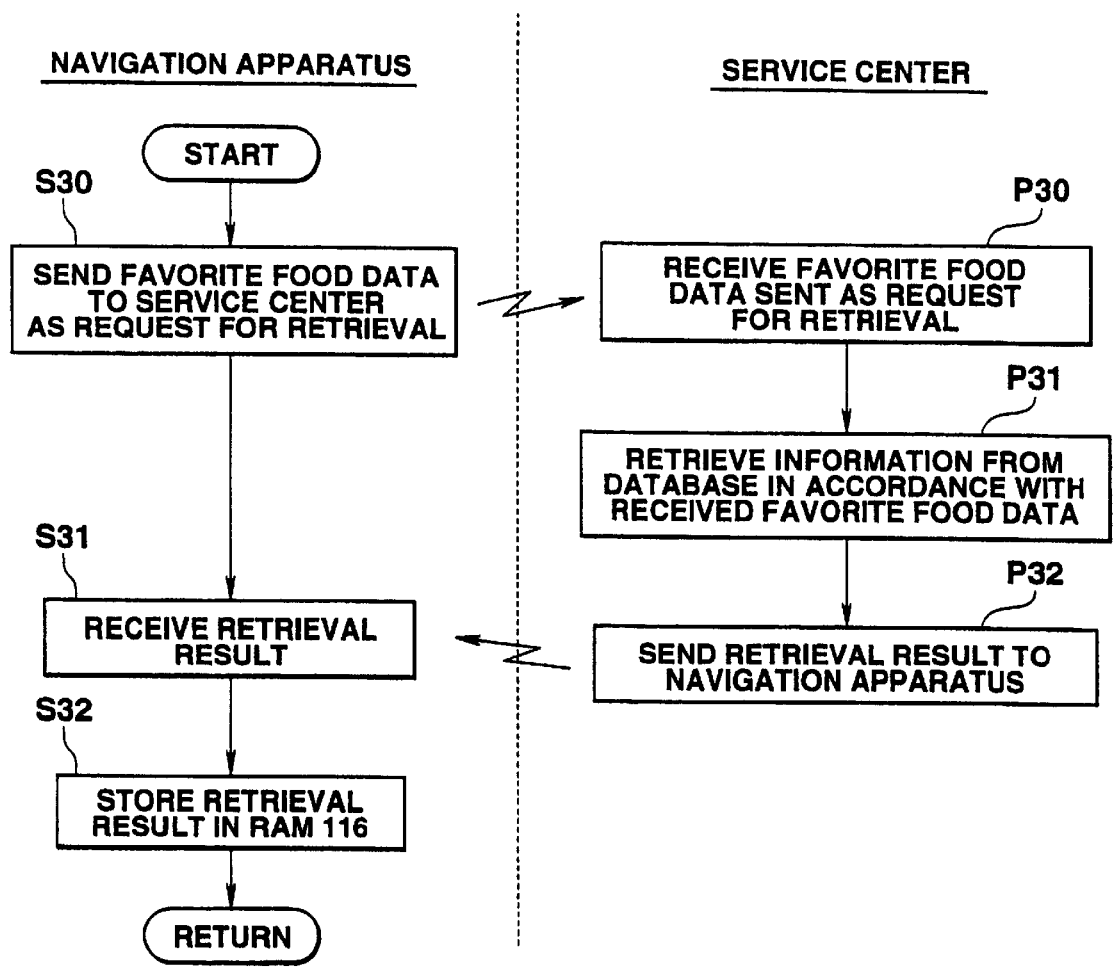

NETWORK SYSTEM FOR SERVING INFORMATION TO MOBILE TERMINAL APPARATUS

TECHNICAL FIELD

The present invention relates to a system for serving various information which a server or a host computer retains to a mobile terminal apparatus through a network.

BACKGROUND ART

Various data has been digitized and recorded as a database in recent years, and desired data can be acquired from the database by utilizing a computer. Meanwhile, computers have been minified in size and become portable and mountable in cars. The development of a network which connects host computers to each other and the enhancement of a radio infrastructure enable users to freely acquire data anywhere from given computers.

However, when the amount of accessible information is large, the distinction between necessary information and unnecessary information is complicated, and appropriate information cannot be easily acquired when needed.

It is accordingly an object of the present invention to provide a system which allows a user to acquire necessary information with ease.

It is another object of the present invention to provide a system which supplies a user with information which will help the user's activities when he/she goes to an unfamiliar building, facility, place or local area on foot or by car.

DISCLOSURE OF THE INVENTION

According to the first aspect of the present invention, there is provided an information serving system comprising a mobile terminal apparatus and an information serving apparatus, said mobile terminal apparatus including specific information storage means (20,117) for storing specific information, transmission means (10,12,111,118) for transmitting the specific information stored in said specific information storage means (20,117) to said information serving apparatus, reception means (10,12,111,118) for receiving information from said information serving apparatus, and output means (18,113) for outputting (for example, displaying, and printing) the information received by said reception means (10,12,111,118), said information serving apparatus including a database (70,72,74,143) which stores information on places, retrieval means (64,66,142) for receiving the specific information transmitted from said mobile terminal apparatus and retrieving information on a particular place from said database (70,72,74,143) in accordance with said specific information as information which a user consults in order to determine a place to which the user is to move, and reply means (60,62,141) for transmitting the information retrieved by said retrieval means (64,66,142) to said mobile terminal apparatus.

For example, said specific information storage means (20) stores information to utilize a public facility; said database (70,72,74) stores location information on locations of installations in said public facility; said retrieval means (64,66) includes means for receiving the specific information transmitted from said mobile terminal apparatus and retrieving location information on the location of at least one of said installations from said database (70,72,74) in accordance with said specific information; and said reply means (60,62) includes means for transmitting the location information retrieved by said retrieval means (64,66) to said mobile terminal apparatus as map information.

For example, said specific information storage means (20) stores train ticket information as said specific information; said information serving apparatus reads out said train ticket information from said specific information storage means (20) through communications with said mobile terminal information, and transmits location information on a train location which corresponds to said train ticket information and in which the user is to board a train to said mobile terminal apparatus, together with a map of a station yard; and said mobile terminal apparatus further includes map output means (18) for outputting said map with said train location being shown on said map in accordance with the location information transmitted from said information serving apparatus.

For example, said specific information storage means (20) stores personal information on at least one of age and taste as said specific information; said transmission means (10, 12) transmits the personal information stored in said specific information storage means (20) to said information serving apparatus;

said retrieval means (64,66) receives the personal information transmitted from said mobile terminal apparatus, and retrieves location information on the location of at least one of said installations from said database (70,72,74) in accordance with said personal information; and said reply means (60,62) transmits the location information which said retrieval means (64,66) has retrieved in accordance with said personal information to said mobile terminal apparatus.

Said retrieval means (64,66) may retrieve said location information from said database (70,72,74), using a time element based on a current time as a condition.

Said mobile terminal apparatus may further includes map output means (18,113) for outputting a map and output control means (10,14111,112) for controlling said map output means (18,113) to outputting said map with the retrieved information from said information serving apparatus being shown on said map.

Said mobile terminal apparatus may further include time measuring means (114) for measuring time; and when said time measuring means (114) measures a predetermined time, said transmission means (111,118) requests said retrieval means (142) to perform the retrieval.

Said mobile terminal apparatus may further includes distance detection means (120) for detecting a distance by which said mobile terminal apparatus has been moved; and when said distance detection means (111,120) detects that said mobile terminal apparatus has been moved by a predetermined distance, said transmission means (111,118) requests said retrieval means (142) to perform the retrieval.

According to the second aspect of the present invention, there is provided an information serving apparatus which communicates with a mobile terminal apparatus, said information serving apparatus comprising:

a database (72,74,76,143) which stores various information on places;

reception means (60,62,141) for receiving, through communications with said mobile terminal apparatus, specific information stored in said mobile terminal apparatus;

retrieval means (64,66,142) for retrieving information from said database (70,72,74,143) as information which a user of said mobile terminal apparatus consults in order to determine a place to which the user is to move, in accordance with the specific information received by said reception means (60,62,141); and transmission means (60,62,141) for transmitting the information retrieved by said retrieval means (64,66,142) to said mobile terminal apparatus.

For example, said information serving apparatus is arranged in a public facility, and communicates with said mobile terminal apparatus which is moved in said public facility; said database (70,72,74) stores location information on locations of installations in said public facility; when said reception means (60,62) receives information input by the user, said retrieval means (64,66) retrieves location information on the location of at least one of said installations from said database (70,72,74) in accordance with the information input by the user, and said transmission means (60,62) transmits to said mobile terminal apparatus the location information which said retrieval means (64,66) has retrieved in accordance with the information input by the user.

Said transmission means (60,62) may transmit the location information retrieved by said retrieval means (64,66) to said mobile terminal apparatus as information to be output on a output of said mobile terminal apparatus as a map showing the location of said at least one of said installations.

According to the third aspect of the present invention, there is provided a mobile terminal apparatus comprising:

communication means (12,118) for performing data communications;

storage means (20,117,135) for storing specific information;

request means (10,12,111,118) for outputting the specific information stored in said storage means (20,117,135) to a predetermined external apparatus as a request for supply of associated information when a predetermined place condition is satisfied as a result of a movement of said mobile terminal apparatus;

communication control means (10,111) for controlling said communication means (12,118) to receive retrieved information including position information and sent from said predetermined external apparatus in reply to said request; and output means (18,113) for outputting a map with said received information being shown in a corresponding position on said map.

The mobile terminal apparatus may further comprising navigation means (112) for making said output means (113) outputting a map of an area around a current location of said mobile terminal apparatus with said current location being shown on said map.

Said mobile terminal apparatus may further comprise time measuring means (111,114) for measuring time; and when said time measuring means (111,114) measures a predetermined time, said request means (111,118) requests said predetermined external apparatus to perform a retrieval in accordance with said specific information.

For example it may further includes distance detection means (120) for detecting a traveling distance which a vehicle has traveled; and when said traveling distance detection means (120) detects a predetermined traveling distance, said request means (111,118) requests said predetermined external apparatus to perform a retrieval in accordance with said specific information.

BRIEF DESCRIPTION OF THE DRAWINGS

FIG. 1 is a block diagram which schematically shows the structure of an information serving system according to the first embodiment of the present invention;

FIG. 2 is a block diagram showing the structure of a portable apparatus 8 according to the first embodiment;

FIG. 16 is a flowchart explaining a process (2) for communications between the car navigation apparatus and the service center according to the second embodiment;

FIG. 17 is a diagram exemplifying drive data which is input to the car navigation apparatus illustrated in FIG. 9.

BEST MODE FOR CARRYING OUT THE INVENTION

First Embodiment

Figure 3A:
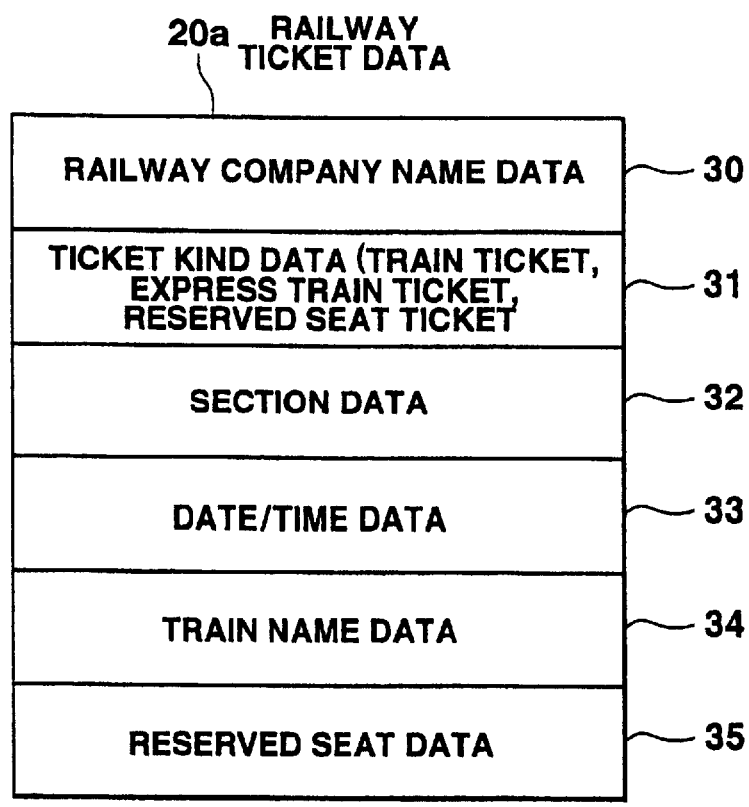
FIGS. 3A and 3B are diagrams exemplifying the structure of various data stored in a memory 20 of the portable apparatus 8 according to the first embodiment.

The first embodiment will now be explained with reference to an example in which an information serving system, in the case where a user carries a portable computer with him/her, is applied to a railroad station which is a public facility.

FIG. 1 is a block diagram which schematically shows the structure of the information serving system according to the first embodiment. This system includes a terminal apparatus 4 and a portable apparatus 8.

The terminal apparatus 4 is installed at a ticket gate in a station, for example, and communicates with the portable apparatus 8 which a user who passes through the ticket gate carries with him/her. When the terminal apparatus 4 acquires data functioning as a ticket from the portable apparatus 8, the terminal apparatus 4 performs a gate opening and closing control, simultaneous with which the terminal apparatus 4 supplies the user with information which will be helpful when using the facility. Details will be described later.

In addition to the function as a ticket for location a train, the portable apparatus 8 has the function of showing the user the information supplied from the terminal apparatus 4, as will be described later in detail.

The portable apparatus 8 is realized as a small-sized computer whose operation is controlled by any program stored in a storage medium. The portable apparatus 8 can also be formed as a thin, portable card-type apparatus.

FIG. 2 is a block diagram showing the structure of the portable apparatus 8. The portable apparatus 8 includes a CPU 10, a communication section 12, a storage unit 14, an input section 16, a display section 18 and a memory 20.

The CPU 10 controls the entirety of the portable apparatus 8, and the operation of the CPU 10 is controlled by any program stored in the storage unit 14 or the memory 20. The CPU 10 controls the individual sections in accordance with control programs, thereby making the portable apparatus 8 function.

The communication section 12 sends and receives various data to and from the terminal apparatus 4 by infrared rays or radio waves under the control of the CPU 10 at the time the portable apparatus 8 passes through the ticket gate.

The storage unit 14 stores various programs and data, etc. for controlling the operation of the CPU 10.

The input section 16 is one to which a user inputs an instruction and so forth in order to use the functions conferred on the portable apparatus 8, and controls the input operations corresponding to keys provided on the portable apparatus 8.

The display section 18 causes a screen to display the contents of data sent from the terminal apparatus 4, a message and so on for use in utilizing the functions of the portable apparatus 8.

The memory 20 functions as a work memory for the operation of the CPU 10, and also stores a program(s) and various data. Those various data include railway ticket data 20a and personal data 20b. The railway ticket data 20a contains the data functioning as a ticket. The personal data 20b is data concerning the person who has the portable apparatus 8.

Figure 3B:
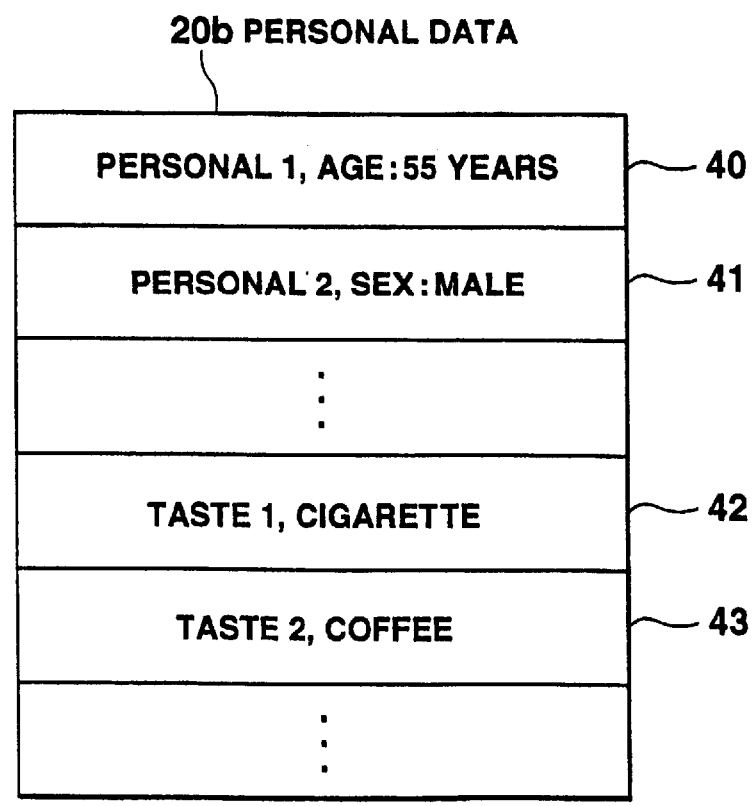

FIGS. 3A and 3B exemplify the structures of various data stored in the memory 20. FIG. 3A illustrates the railway ticket data 20a. The railway ticket data 20a contains railway company name data 30, ticket kind data 31, section data 32, date/time data 33, train name data 34 and reserved seat data 35. The railway company name data 30 specifies the name of the railway company which has issued the ticket. The ticket kind data 31 specifies the kind of the ticket (whether the ticket is a train ticket, an express train ticket, a reserved seat ticket or the like). The section data 32 represents the departure point and the destination. The date/time data 33 represents the departure date and time of the train which the user intends to board when the ticket is a reserved seat ticket, or represents the validity date of the ticket when the ticket is a non-reserved seat ticket. The train name data 34 specifies the name of the train which the user intends to board when the ticket is a reserved seat ticket. The reserved seat data 35 specifies which seat has been reserved when the ticket is a reserved seat ticket. The railway ticket data 20a is input at a booking window in either a station or a travel company in exchange of the fare.

FIG. 3B shows the personal data 20b. The personal data 20b contains information (personal 1, 2, . . . ) concerning the person who owns or uses the portable apparatus 8, and information (taste 1, 2, . . . ) concerning his/her taste. Examples of the information concerning the person are "age" and "sex", while examples of the information concerning his/her taste are "cigarette" and "coffee." The personal data 20b is one registered in advance by the user.

Figure 4:
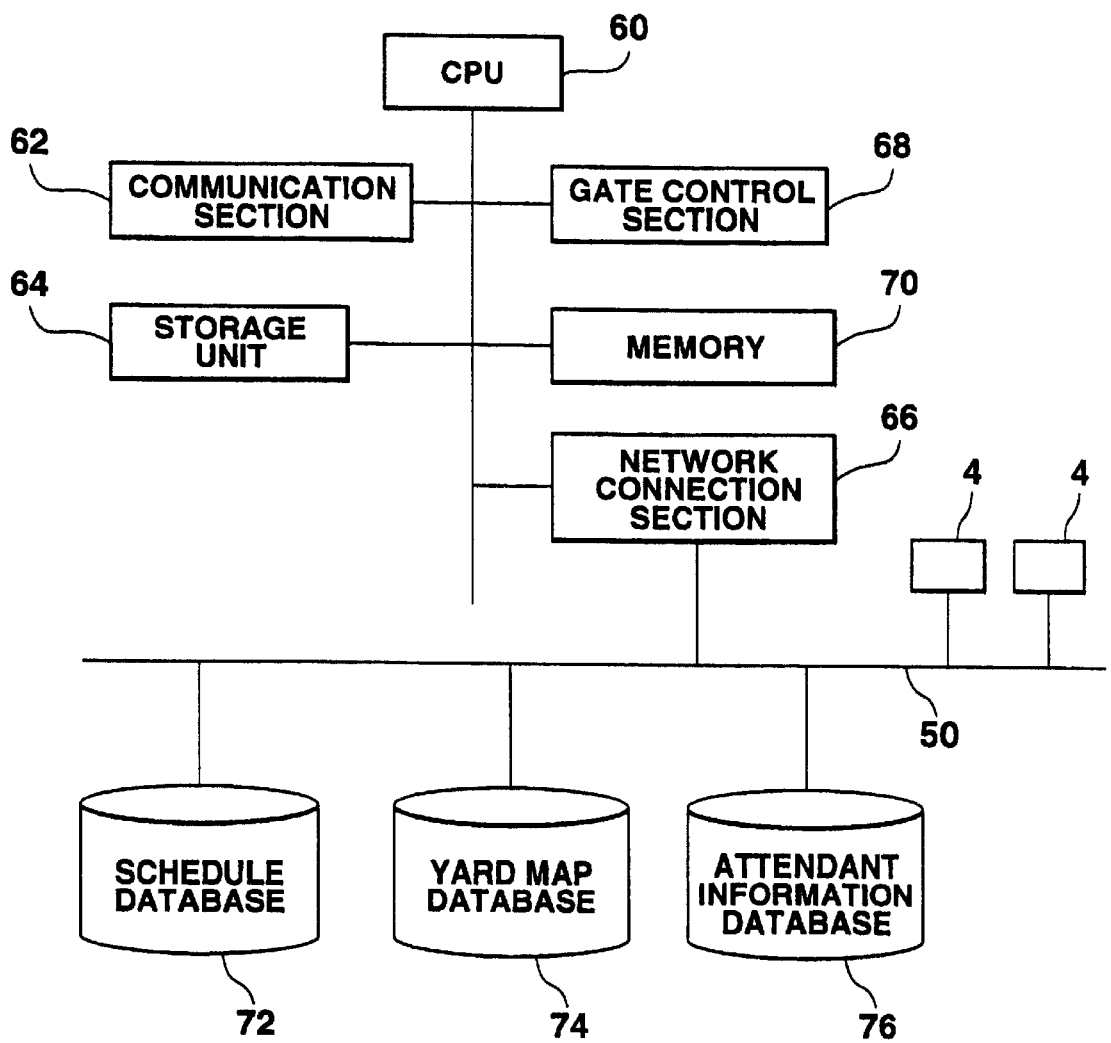
FIG. 4 is a block diagram showing the structure of a terminal apparatus 4 according to the first embodiment.

FIG. 4 is a block diagram showing the structure of a system including terminal apparatuses 4 and which are arranged in a station. The terminal apparatuses 4 are installed at the ticket gates of the station, and are connected to a schedule database 72, a yard map database 74 and an attendant information database 76 via a communication line 50.

Each terminal apparatus 4 includes a CPU 60, a communication section 62, a storage unit 64, a network connection section 66, a gate control section 68 and a memory 70.

The CPU 60 controls the entirety of the terminal apparatus 4, and the operation of the CPU 60 is controlled by any program stored in the memory 70. The CPU 60 controls the individual sections in accordance with control programs stored in the storage unit 64 or the memory 70, thereby making the terminal apparatus 4 function. By counting operation clocks, the CPU 60 functions as a timer for measuring the current time, etc.

The communication section 62 sends and receives various data to and from the portable apparatus 8 by infrared rays or radio waves under the control of the CPU 60 at the time the portable apparatus 8 passes through a ticket gate.

The storage unit 64 stores various programs and data, etc. for controlling the operation of the CPU 60.

In accordance with an instruction supplied from the CPU 60, the network connection section 66 retrieves necessary information from the databases connected thereto via a network.

Depending on whether the contents of the railway ticket data 20a are proper or not, the gate control section 68 performs control operations for opening/closing a ticket gate which the user passes through.

The memory 70 functions as a work memory for the operation of the CPU 60.

The schedule database 72 stores information contained in a train schedule. The information stored in the schedule database 72 includes the names, departure times, destinations and location (platforms) of trains and attendant information associated with the trains.

The yard map database 74 stores map data showing the structure of a station yard and including the locations of platforms, stairs, ticket gates, etc. The attendant information database 76 stores attendant information concerning various installations in the station yard. The attendant information contains information on the locations of restaurants, coffee stands, toilets, kiosks, stairs and escalators, for example.

Figure 5:
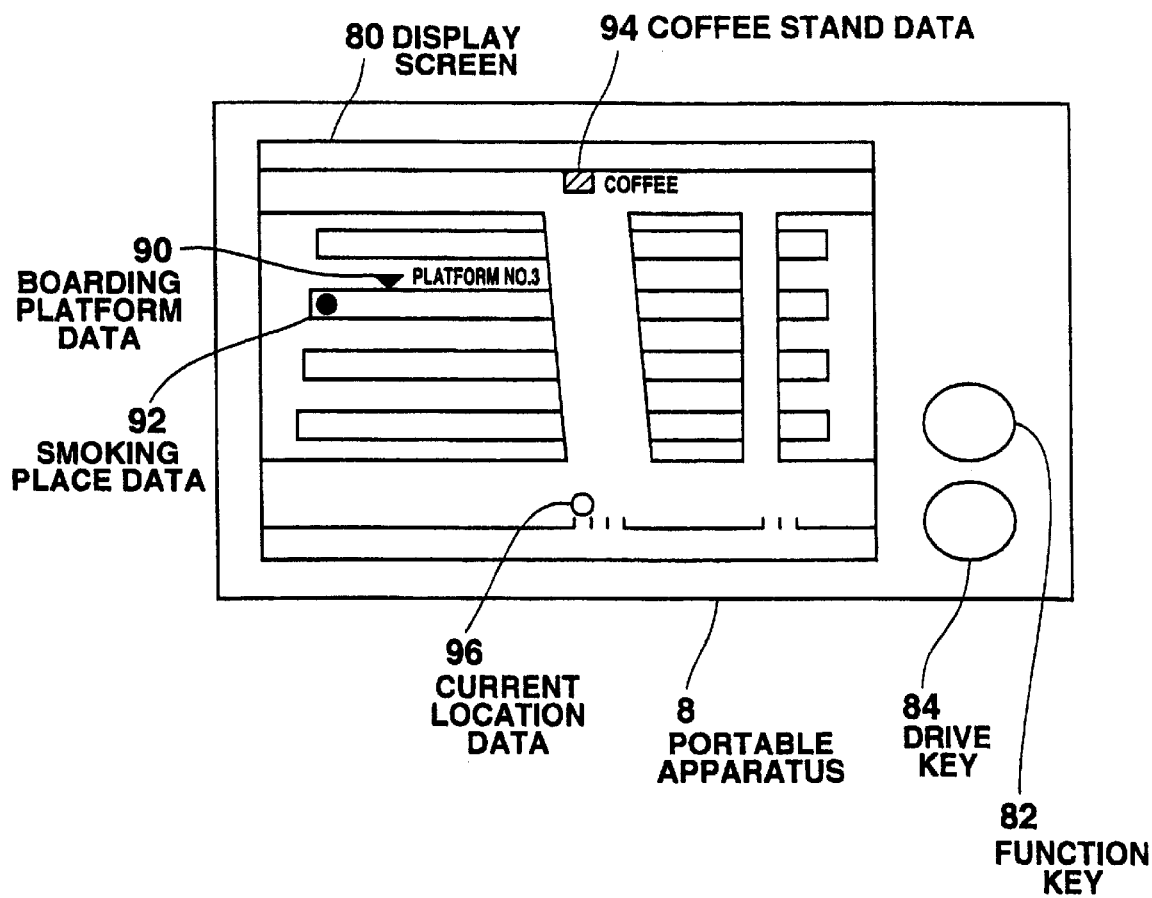
FIG. 5 is a diagram exemplifying service data acquired from the terminal apparatus 4 and displayed on a screen of the portable apparatus 8.

FIG. 5 illustrates the state in which a display screen 80 displays the map of the station yard in accordance with data which the portable apparatus 8 has acquired from the terminal apparatus 4. The display screen 80 displays, for example, the contents of data stored as the railway ticket data 20a and the personal data 20b, various setting menus (for the input of the personal data, etc.) and images, etc. (examples of which will be described later) representing other information acquired from the terminal apparatus 4.

As illustrated in FIG. 5, the portable apparatus 8 has a function key 82 and a drive key 84.

The function key 82 is one for giving various setting instructions to the portable apparatus 8 in order to use the functions of the portable apparatus 8 as in the case of registering the personal data 20*b*. The drive key 84 is one for making the portable apparatus 8 activate its functions.

The operation of a system for utilizing facilities according to the first embodiment will now be described with reference to flowcharts.

Figure 6:
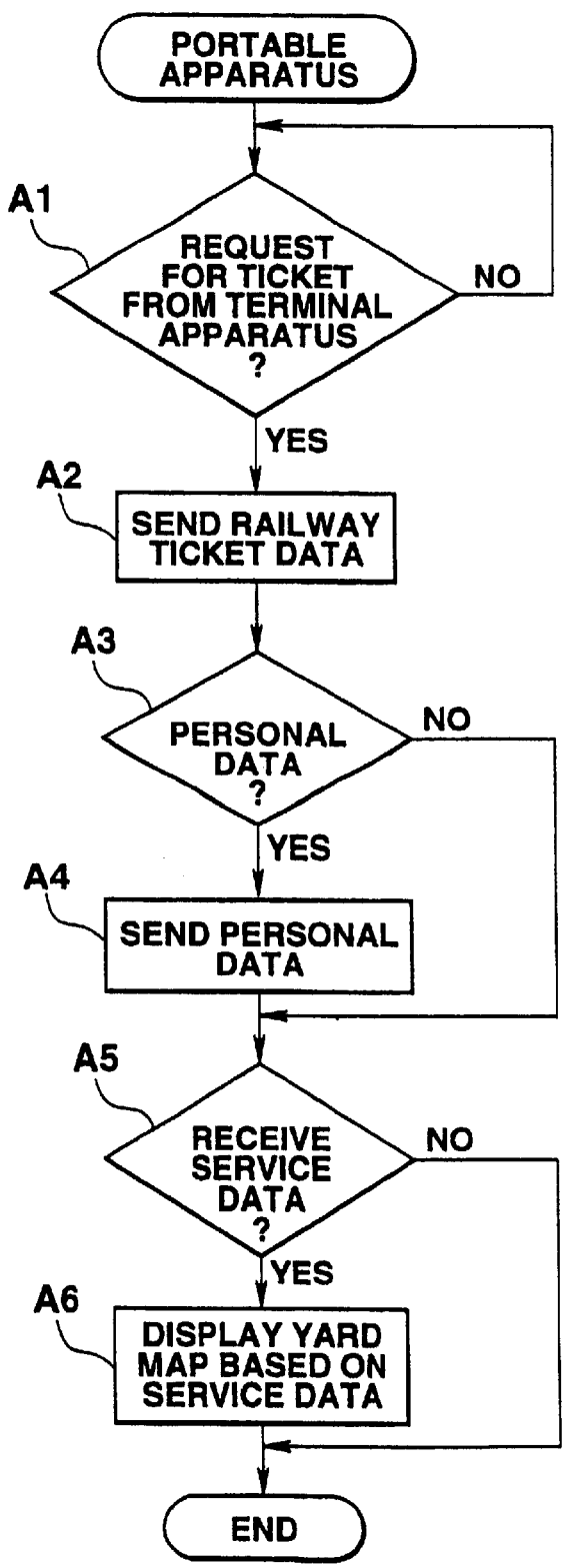
FIG. 6 is a flowchart showing the operation of the portable apparatus 8 according to the first embodiment at the time of passing through a ticket gate.
Figure 7:
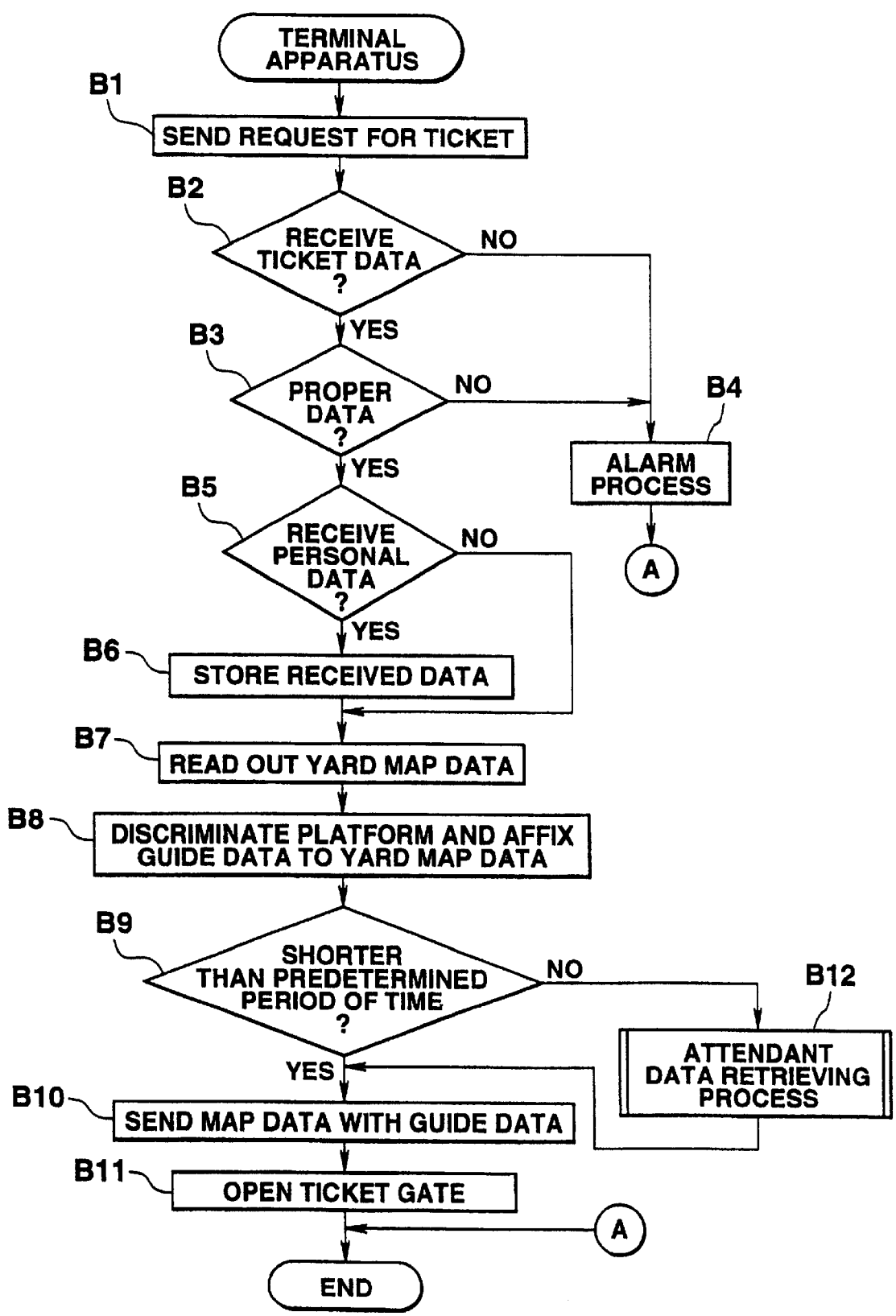
FIG. 7 is a flowchart showing the operation of the terminal apparatus 4 according to the first embodiment.
Figure 8:
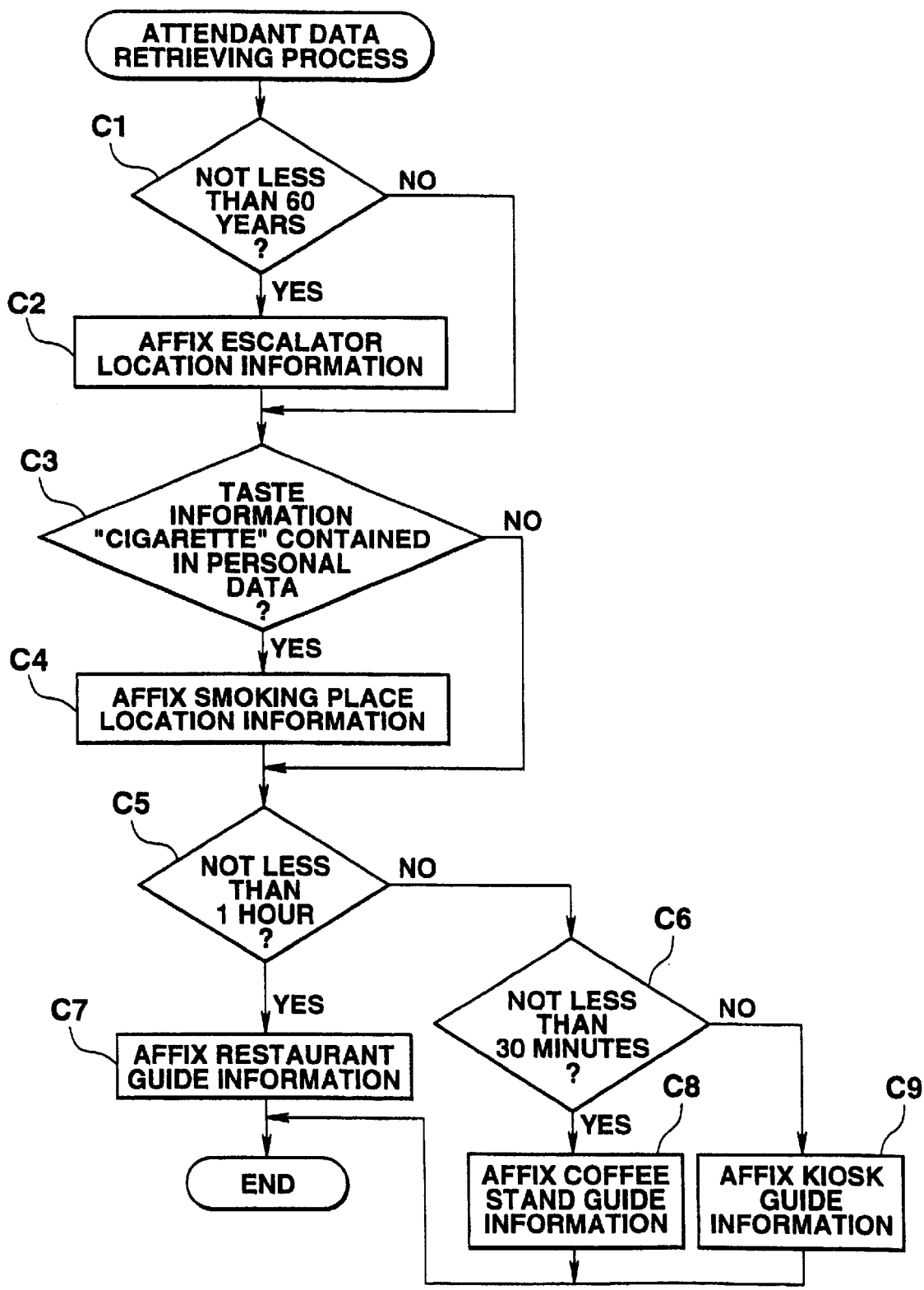
FIG. 8 is a flowchart showing by what steps the terminal apparatus 4 of the first embodiment performs an attendant data retrieving process.

FIG. 6 is a flowchart explaining how the operation of the portable apparatus 8 at the time of passing through a ticket gate. FIG. 7 is a flowchart explaining the operation of the terminal apparatus 4. FIG. 8 is a flowchart explaining the steps in an attendant data retrieving process which the terminal apparatus 4 performs.

When a terminal apparatus 4 installed at a ticket gate detects the approach of the portable apparatus 8, the terminal apparatus 4 makes the communication section 62 send a request for a ticket (FIG. 7, step B1).

When the CPU 10 of the portable apparatus 8 receives the request for a ticket from the terminal apparatus 4 through the communication section 12 (FIG. 6, step A1), the portable apparatus 8 sends ticket data stored in the memory 20 and containing the railway ticket data 20*a*, etc. to the terminal apparatus 4 through the communication section 12 (step A2). Further, the CPU 10 determines whether the memory 20 stores the personal data 20*b* (step A3). When the CPU 10 determines that the memory 20 stores the personal data 20*b*, the portable apparatus 8 sends the personal data 20*b* to the terminal apparatus 4 through the communication section 12 (step A4).

When the terminal apparatus 4 receives the railway ticket data 20*a* from the portable apparatus 8 (step B2), the terminal apparatus 4 refers to data stored in the schedule database 72 via the network connection section 66, and determines whether data such as that shown in FIG. 3A is proper (step B3).

When the terminal apparatus 4 does not receive the ticket data in reply to the request for a ticket in the step B2, or when the terminal apparatus 4 determines in the step B3 that the contents of the received ticket data are not proper, the terminal apparatus 4 executes an alarm process (step B4). In the alarm process, the terminal apparatus 4 which is provided with a non-illustrated output unit (such as a lamp, a display, a speaker or the like), etc. causes the output unit to output an alarm, or sends alarm data to the portable apparatus 8 through the communication section 62, in order to alert the portable apparatus 8.

When the terminal apparatus 4 determines in the step B3 that the received railway ticket data is proper, then it determines whether the personal data 20*b* has been received together with the railway ticket data 20*a* (step B5). When the terminal apparatus 4 determines in the step B5 that the personal data 20*b* has been received together with the railway ticket data 20*a*, the terminal apparatus 4 stores the received personal data in the memory 70 (step B6).

Next the CPU 60 of the terminal apparatus 4 reads out the yard map data from the yard map database 74 through the network connection section 66 (step B7). Based on the railway company name data 30, the ticket kind data 31, the train name data 34 and the reserved seat data 35, etc., contained in the railway ticket data 20*a* received from the portable apparatus 8, the CPU 60 discriminates the place (platform) where the user is to board a train, and affixes guide data specifying the location place to the yard map data (step B8).

Then, in accordance with the date/time data 33 contained in the railway ticket data 20*a* and current time data, the CPU 60 determines whether the interval between the current time and the departure time of the train is shorter than a predetermined period of time, in other words, whether the interval between the current time and the departure time of the train is so short that the user should directly go to the place for the departure of the train (step B9).

When the CPU 60 determines in the step B9 that the interval between the current time and the departure time of the train is shorter than the predetermined period of time, the CPU 60 sends the yard map data to which the guide data has been affixed in the step B8 to the portable apparatus 8 through the communication section 62 (step B10).

The portable apparatus 8 determines whether the service data sent from the terminal apparatus 4 in the step B10, in this case, the yard map data with the guide data affixed thereto has been received (step A5). When the portable apparatus 8 determines in the step A5 that the service data has been received, the CPU 10 causes the display section 18 to display a yard map, based on the service data (step A6). In the yard map, the place for the departure of the train which the user is going to board, more specifically, the location platform and the location thereof, are shown using any predetermined mark, character and/or the like. When the portable apparatus 8 determines in the step A5 that the service data has not been received, the portable apparatus 8 terminates processing.

After the terminal apparatus 4 sends the service data to the portable apparatus 8 in the step B10, the terminal apparatus 4 makes the gate control section 68 open the ticket gate so that the user can pass therethrough (step B11).

When the CPU 60 determines in the step B9 that the interval between the current time and the departure time of the train which the user is going to board is not shorter than the predetermined period of time, the terminal apparatus 4 executes the attendant data retrieving process (step B12). The terminal apparatus 4 executes the attendant data retrieving process by the steps shown in the flowchart of FIG. 8, for example. Let it be assumed that the personal data acquired form the portable apparatus 8 contains information such as the age information "55 years" and the taste information "cigarette" shown in FIG. 3B.

First of all, the CPU 60 of the terminal apparatus 4 determines whether the age information contained in the personal data is not less than "60 years" preset in the storage unit 64 (step C1). When the age information is not less than "60 years", the terminal apparatus 4 retrieves escalator location information on the location of an escalator from the attendant information database 76, and affixes the escalator location information to the yard map data (step C2).

Next the CPU 60 determines whether the personal data contains the taste information "cigarette" (step C3). When the CPU 60 determines in the step C3 that the personal data contains the taste information "cigarette", the CPU 60 retrieves smoking place location information on the location of a smoking place from the attendant information database 76, and affixes the smoking place location information to the yard map data (step C4).

Furthermore, based on the date/time data 33 contained in the railway ticket data 20*a* and the current time, the CPU 60 determines whether the interval from the current time between the current time and the departure time of the train which the user will board is not less than 1 hour (step C5). When the CPU 60 determines in the step C5 that the interval is not less than 1 hour, it acquires, from the attendant information database 76, restaurant guide information concerning a restaurant where the user can spend time until the departure of the train, and affixes the restaurant guide information to the yard map data (step C7).

When the CPU 60 determines in the step C5 that the interval between the current time and the departure time is less than 1 hour, then the CPU 60 determines whether the interval is not less than 30 minutes (step C6). When the CPU 60 determines in the step C6 that the interval is not less than 30 minutes, the CPU 60 acquires, from the attendant information database 76, coffee stand guide information concerning a coffee stand where the user can spend time until the departure of the train, and affixes the coffee stand guide information to the yard map data (step C8).

When the CPU 60 determines in the step C6 that the interval is less than 30 minutes, it acquires kiosk guide information from the attendant information database 76, and affixes the kiosk guide information to the yard map data (step C9).

In the above-described attendant data retrieving process, the guide data to be affixed (the restaurant guide information, the coffee stand guide information and the kiosk guide information) is determined in accordance with the interval between the current time and the departure time of the train. However, the guide data to be affixed can be selected in accordance with the contents of the personal data from among a plurality of choices corresponding to individual time zones.

After the step C9, the terminal apparatus 4 sends, to the portable apparatus 8 through the communication section 62, the yard map data to which the guide data and the attendant data have been affixed (step B10).

When the portable apparatus 8 has completely received the service data, the terminal apparatus 4 makes the gate control section 68 open the ticket gate so that the user can pass therethrough (step B11).

In the information serving system of this embodiment, as explained above, the portable apparatus 8 sends the terminal apparatus 4 the railway ticket data 20a and the personal data 20b which the portable apparatus 8 stores, the terminal apparatus 4 sends the portable apparatus 8 the service data according to the contents of the data which the terminal apparatus 4 has received, and the portable apparatus 8 displays the service data sent from the terminal apparatus 4.

The portable apparatus 8 of this embodiment can supply the user with appropriate information, which allows the user to efficiently utilize installations provided in the station yard.

An example of the service data which the display screen 80 of the portable apparatus 8 displays as described above will now be described with reference to FIG. 5.

In order to facilitate understanding, let it be assumed that the date for location the train and the departure time 13:45 of the train have been set as the date/time data 33 in the railway ticket data 20a. The personal data 20b is as shown in FIG. 3B.

In this case also, the railway ticket data 20a and the personal data 20b are sent to the terminal apparatus 4 in the steps A2 and A4 shown in FIG. 6. In the step B3 shown in FIG. 7, the terminal apparatus 4 refers to the schedule database 72 and discriminates the platform from which the train is going to depart, based on the railway ticket data 20a received in the step B2. Let it be assumed that the train is going to depart from platform No. 3. In the step B8, the guide data representing the location of platform No. 3 discriminated in the step B3 is affixed to the yard map data read out in the step B7. In the step B9, the current time which is, for example, 13:00, and the departure time 13:45 which the railway ticket data 20a specifies are compared with each other, and it is determined that the interval between the current time and the departure time is not shorter than a predetermined period of time. Then the attendant data retrieving process, the details of which are shown in FIG. 8, is carried out in the step B12.

Further, in the step C3, it is determined that the personal data 20b contains the taste information "cigarette", and consequently the smoking place location information is affixed to the yard map data in the step C4.

Moreover, in the steps C5 and C6, it is determined that the interval between the current time and the departure time is less than 1 hour but is not less than 30 minutes, and accordingly the coffee stand guide information is affixed to the yard map data in the step C8.

In the step B10, the terminal apparatus 4 sends the portable apparatus 8 the yard map data to which the guide data has been thus affixed.

In the step A5, the display section 18 of the portable apparatus 8 receives the yard map data to which the guide data has been affixed and which has been sent in the step B10. Based on the data as received, a yard map is displayed on the display screen 80 in the step A6.

As illustrated in FIG. 5, location platform data 90 representing the location platform and affixed to the yard map data in the step B8, smoking place data 92 representing a smoking place, and coffee stand data 94 representing a coffee stand are displayed together with the yard map data on the display screen 80. The current location of the portable apparatus 8 in the station yard is discriminated by identifying the terminal apparatus 4 which the portable apparatus 8 has communicated with, and current location data 96 specifying the current location of the portable apparatus 8 is displayed on the display screen 80.

Since the personal data 20b contains the age information "55 years", it is determined in the step C1 shown in FIG. 8 that the age is less than 60 years, and therefore no escalator location information is affixed to the yard map data. Accordingly, no data representing an escalator is displayed on the display screen 80 illustrated in FIG. 5.

In the first embodiment, the age and the taste "cigarette" which are contained in the personal data 20b are exemplified. However, any other personal information can also be adopted. The attendant information database 76 is searched in association with each piece of information set in the personal data 20b, and if there is any corresponding information in the attendant information database 76, it will be sent as the service data to the portable apparatus 8.

Moreover, according to the first embodiment, one of the restaurant guide information, the coffee stand guide information and the kiosk guide information is selected on a 30-minute intervals basis, in other words, in accordance with whether the period of time for which the user will wait until the departure of the train is less than 30 minutes, or is not less than 30 minutes but is less than 1 hour, or is not less than 1 hour, and the selected guide information is affixed to the yard map data. However, the time intervals and the information to be affixed are not limited thereto, and can be freely determined depending on facilities.

Furthermore, the first embodiment has been explained exemplifying a station as a public facility. However, the present invention is applicable also to other public facilities such as an airport, a harbor, a government office, a library, a stadium, a concert hall, etc. In the case of the public facilities such as a stadium, a concert hall and the like where seats are reserved by tickets, the same operations as those mentioned previously can be attained by registering ticket information in the portable apparatus 8 of the first embodiment and installing terminal apparatuses 4 at the entrances.

The terminal apparatuses 4 may be installed not only at the facilities' entrances like ticket gates, but also at given locations within or around the facilities.

Displaying the yard map under the control of the display section 18 is exemplified as the information output mode of the portable apparatus 8 in the first embodiment. However, other output modes can be employed. For example, a terminal apparatus 4 may send voice data to the portable apparatus 8, and the portable apparatus 8 may output a voice or perform printing (the terminal apparatus 4 may send character information/data, etc. to the portable apparatus 8, and the portable apparatus 8 may convert the character information/data, etc. to the voice data).

The above-described steps which the terminal apparatus 4 and the portable apparatus 8 carry out in the first embodiment can be realized by writing those steps in the form of programs executable by computers into recording mediums such as magnetic disks (floppy disks, hard disks, etc.), optical disks (CD-ROMs, DVDs, etc.) and semiconductor memories, for example, and by providing the terminal apparatus 4 and the portable apparatus 8 with the recording mediums. It is also possible to transfer control programs to the terminal apparatus 4 and the portable apparatus 8 through any communication medium. The computers, which realize the apparatuses of the present invention, read the control programs recorded in the recording mediums, and execute the above-described steps while their operations are being controlled by the control programs.

In the first embodiment, the data transmitted from the terminal apparatus 4 to the portable apparatus 8 is displayed on the display section 18. However, the way to output the data is arbitrary. For example, the data may be printed by a printer provided in the portable apparatus 8, and it may be output from a speaker after being transferred to an acoustic sound.

Second Embodiment

An example of an information serving system, in the case where the user moves using a vehicle, will now be described.

The system according to the second embodiment includes a car navigation apparatus 110 having a two-way communication function and mounted in a vehicle as a mobile terminal apparatus, and a service center 140 which sends information to the mobile terminal apparatus via a network.

Figure 9:
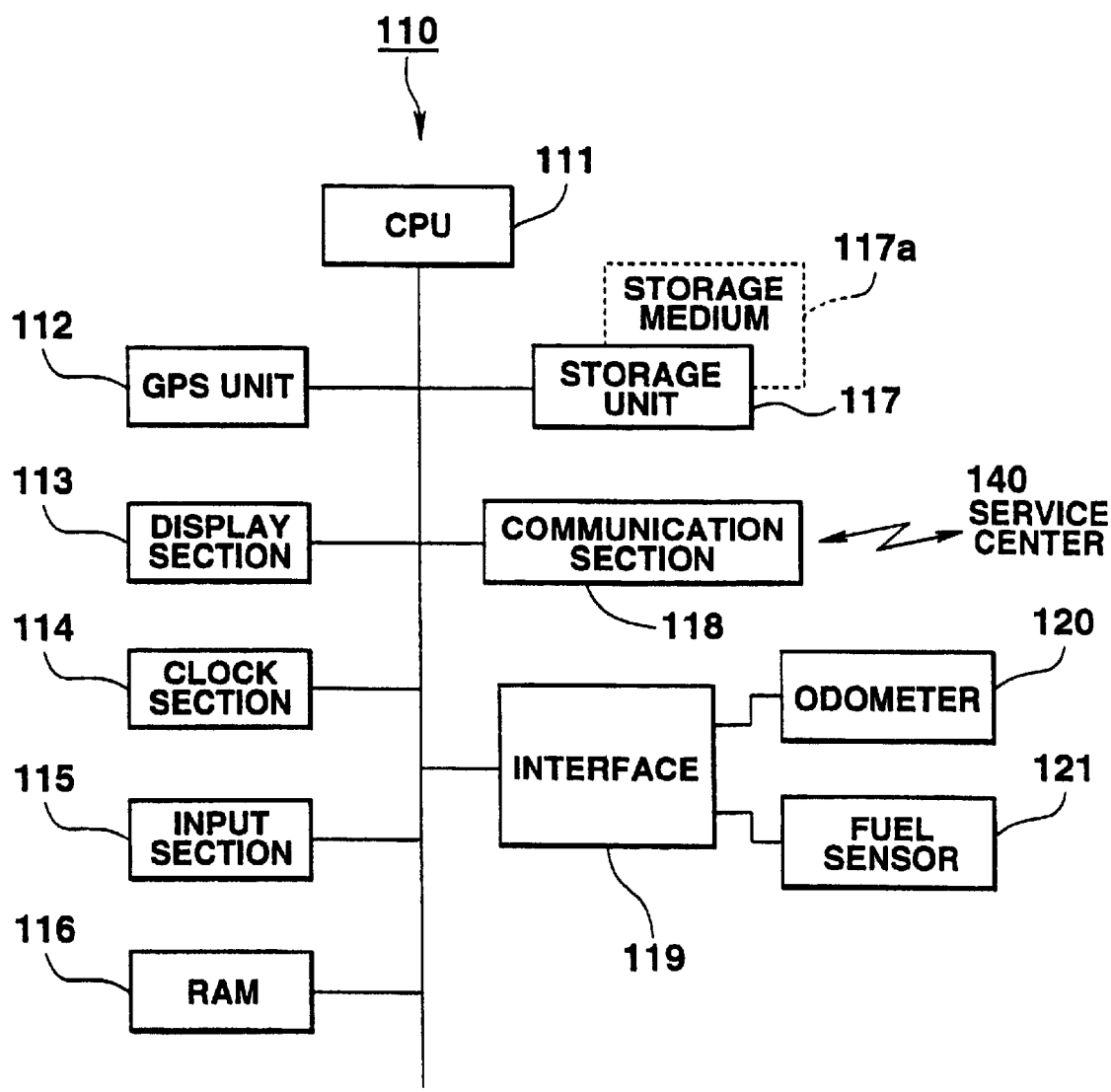
FIG. 9 is a block diagram which schematically shows the structure of a car navigation apparatus according to the second embodiment of the present invention.

FIG. 9 is a block diagram which schematically shows the structure of the aforementioned car navigation apparatus.

The car navigation apparatus 110 has: a CPU 111; a GPS unit 112; a display section 113 apparatus; a clock section 114; an input section 115; a RAM 116; a storage unit 117 with a storage medium 117a; a communication section 118; an interface 119; an odometer 120 and a fuel sensor 121, etc.

The CPU (Central Processing Unit) 111 stores in a program storage area of the RAM 116 an application program which is selected from system programs and their corresponding various application programs in the storage unit 117. The CPU 111 stores in the RAM 116 various instructions or data supplied from the GPS unit 112, the odometer 120, the fuel sensor 121, etc. In accordance with the supplied instructions or data, the CPU 111 executes various processing according to the application programs stored in the storage unit 117, and stores the result of the processing in the RAM 116.

While the vehicle is in motion, the CPU 111 computes current location coordinates specifying the current location of the vehicle, on the basis of current location data supplied periodically from the GPS unit 112, and retrieves map data representing a map on a predetermined scale and containing the current location coordinates from the storage medium 117a of the storage unit 117. The CPU 111 displays the map data on a display apparatus of the display section 113 as the map of an area around the current location of the vehicle, and displays the current location of the vehicle on the map.

Moreover, the CPU 111 executes a drive assistance process (which will be described later with reference to the flowcharts shown in FIGS. 14 to 16), sends the service center 140 the request for performing a retrieval in association with input drive data, receives the retrieval result including position information and sent from the service center 140 in reply to the request, and displays the retrieval result on the map.

The GPS (Global Positioning System) unit 112 receives latitude information and longitude information, etc. from at least three geosynchronous satellites by means of a dedicated antenna mounted on the vehicle, and outputs current location data obtained by computing the absolute location (the longitude, latitude) of the vehicle to the CPU 111.

The display section 113 has a display apparatus 113a, and a VRAM 113b in which the map data, etc. are stored as image data by the CPU 111. The display 113a displays a map, etc., based on the image data stored in the VRAM 113b.

The clock section 114 has a time measuring function and supplies the current time to the CPU 111. The input section 115 has a cursor key, a numeral input key and various function keys, etc., and outputs a key press signal corresponding to a pressed key to the CPU 111.

The RAM 116 has a work area for storing a designated application program, an input instruction, input data and the result of processing, etc.

The storage unit 117 has the storage medium 117a which stores a program, data and so forth and which is a magnetic/optical storage medium or a semiconductor memory. The storage medium 117a may be fixedly provided in the storage unit 117, or may be removably provided therein.

The storage medium 117a stores system programs, their corresponding various application programs, various data inputting, detecting and communicating processes, and data, etc. processed by individual processing programs.

Further, the storage medium 117a prestores map data obtained by digitizing (expressing in numerical values) points on the roads in maps. The storage medium 117a also stores information concerning gasoline service stations in association with the map data.

The programs and data, etc. stored in the storage medium 117a may be those which the car navigation apparatus has received from another apparatus connected to the car navigation apparatus 110 via a communication line or the like. The above-mentioned another apparatus connected to the car navigation apparatus 110 via the communication line or the like may be provided with a storage unit having such a storage medium, and the programs, data, etc. stored in that storage medium may be utilized by the car navigation apparatus 110 through the communication line.

The communication section 118 is a unit which performs data communications by radio, and has the infrared ray communication function of performing short-distance communications with a PDA 130 on the basis of an IrDA (Inferred ray Data Association) communication protocol and the radio communication function of performing two-way communications with the service center 140.

The interface 119 receives outputs from the odometer 120, and supplies them to the CPU 111 after subjecting them to processing such as A/D conversion.

The odometer 120 is a sensor which detects the distance which the vehicle has traveled and which outputs data representing the measured traveling distance to the CPU 111 through the interface 119.

The fuel sensor 121 detects the residual amount of gasoline (or gas) and the residual amount of oil, and outputs the detected residual amount data to the CPU 111 through the interface 119.

Figures 10, 11:
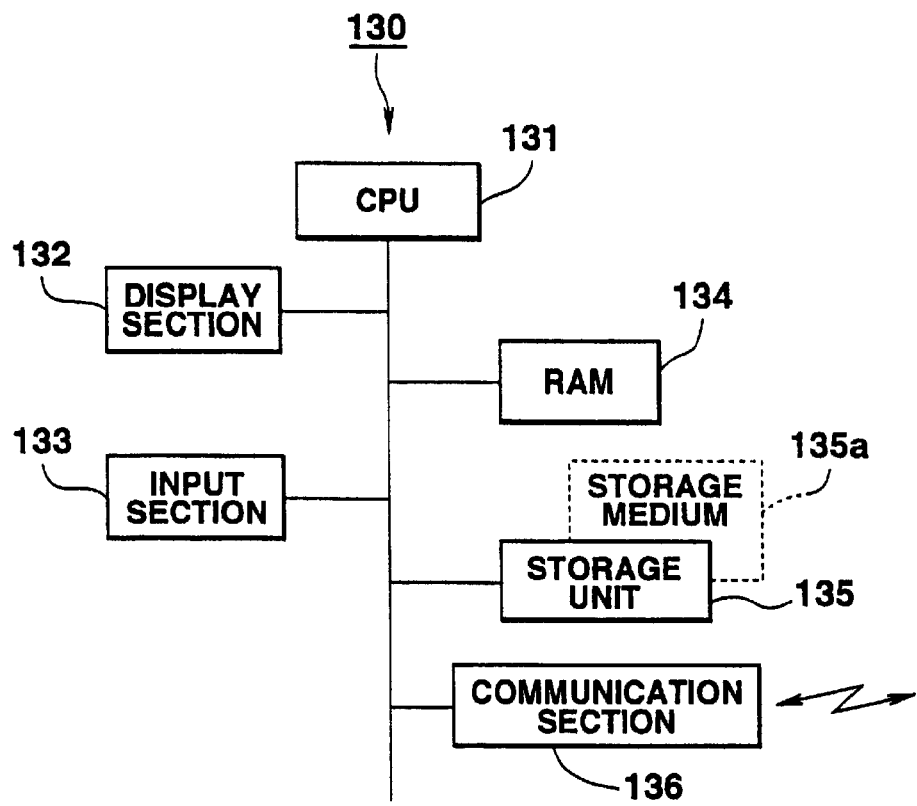
FIG. 10 is a block diagram which schematically shows a PDA according to the second embodiment.
FIG. 11 is a diagram exemplifying data in a personal database which the PDA illustrated in FIG. 10 stores.

FIG. 10 is a block diagram which schematically shows the structure of the PDA (Personal Digital Assistant) 130. The PDA 130 is a portable computer having a schedule management function and an address notebook function, etc. In the second embodiment, the PDA 130 operates as a unit which supplies a destination and personal information concerning any person who travels on the vehicle to the car navigation apparatus 110.

The PDA 130 includes a CPU 131, a display section 132, an input section 133, a RAM 134, a storage unit 135 with a storage medium 135a, and a communication section 136, for example.

The CPU (Central Processing Unit) 131 executes a program stored in the storage unit 135, and stores the result of the execution of the program in the RAM 134.

The display section 132 has an LCD display screen which displays various data.

The input section 133 has, for example, various function keys and a tablet (formed in integration with the display screen) for inputting data with a pen. Using the keys and/or the pen, data is input to the input section 133 (the recognition of a character handwritten with the pen is included).

The storage unit 135 has the storage medium 135a which stores programs, data, etc., and which is a magnetic/optical storage medium or a semiconductor memory. The storage medium 135a may be fixedly provided in the storage unit 135, or may be removably provided therein.

The storage medium 135a stores system programs, various application programs and processed data, etc. The storage medium 135a also stores, as address notebook data, the personal data shown in FIG. 11. The personal data shown in FIG. 11 contains items "name", "telephone No.", "address", "favorite food" and "hobby."

The communication section 136 is a unit which has the infrared ray communication function based on an IrDA communication protocol, and which performs short-distance data communications with the car navigation apparatus 110.

Figures 12, 13:
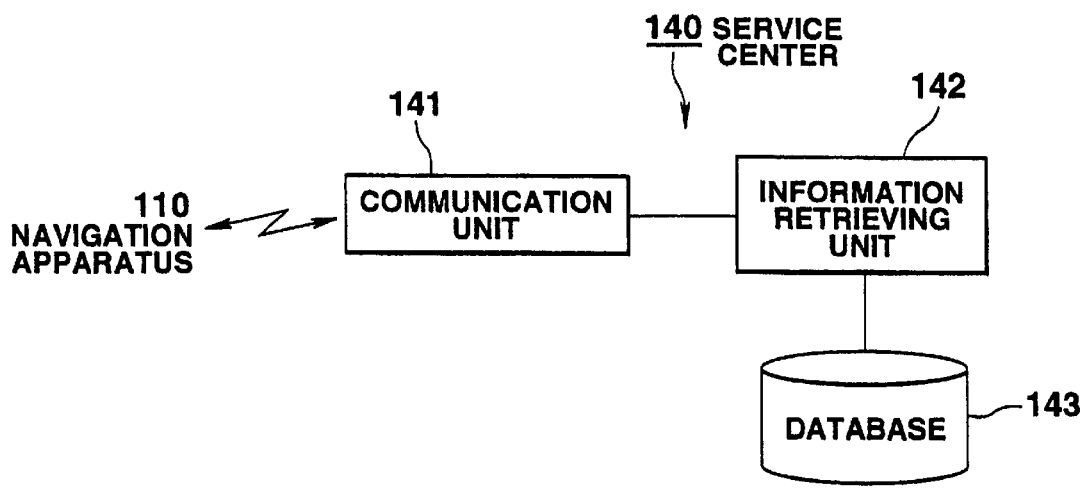
FIG. 12 is a block diagram which schematically shows the structure of a service center 140 according to the second embodiment.
FIG. 13 is a diagram showing an example of a file which a database 143 stores.

FIG. 12 is a block diagram which schematically shows the structure of the service center 140. The service center 140 has a communication unit 141, an information retrieving unit 142 and a database 143.

The communication unit 141 performs two-way radio communications on the basis of a predetermined communication protocol.

The information retrieving unit 142 is a computer having a CPU, a ROM and a RAM, etc. (not shown). In reply to a request for retrieval from an external apparatus such as the car navigation apparatus 110, the information retrieving unit 142 retrieves the corresponding data from the database 143. For example, when the information retrieving unit 142 receives from the car navigation apparatus 110 a request for performing a retrieval in association with a restaurant in a neighboring area, the information retrieving unit 142 retrieves information on such a restaurant from the database 143, and sends the retrieved information in reply.

The database 143 is a collection of integrated data files concerning various information. FIG. 13 is a diagram showing an example of a file stored in the database 143. The file shown in FIG. 13 concerns restaurant data, and individual data items "shop's name", "place", "menu", "kind" and "open hours" are stored in association with each other.

In the case of the data "restaurant A", for example, the place in which the restaurant A is located is "XXX city, x prefecture", the kind of cuisine is "Italian", and the open hours are "24 hours."

Operations according to the second embodiment will now be described.

Figure 14:
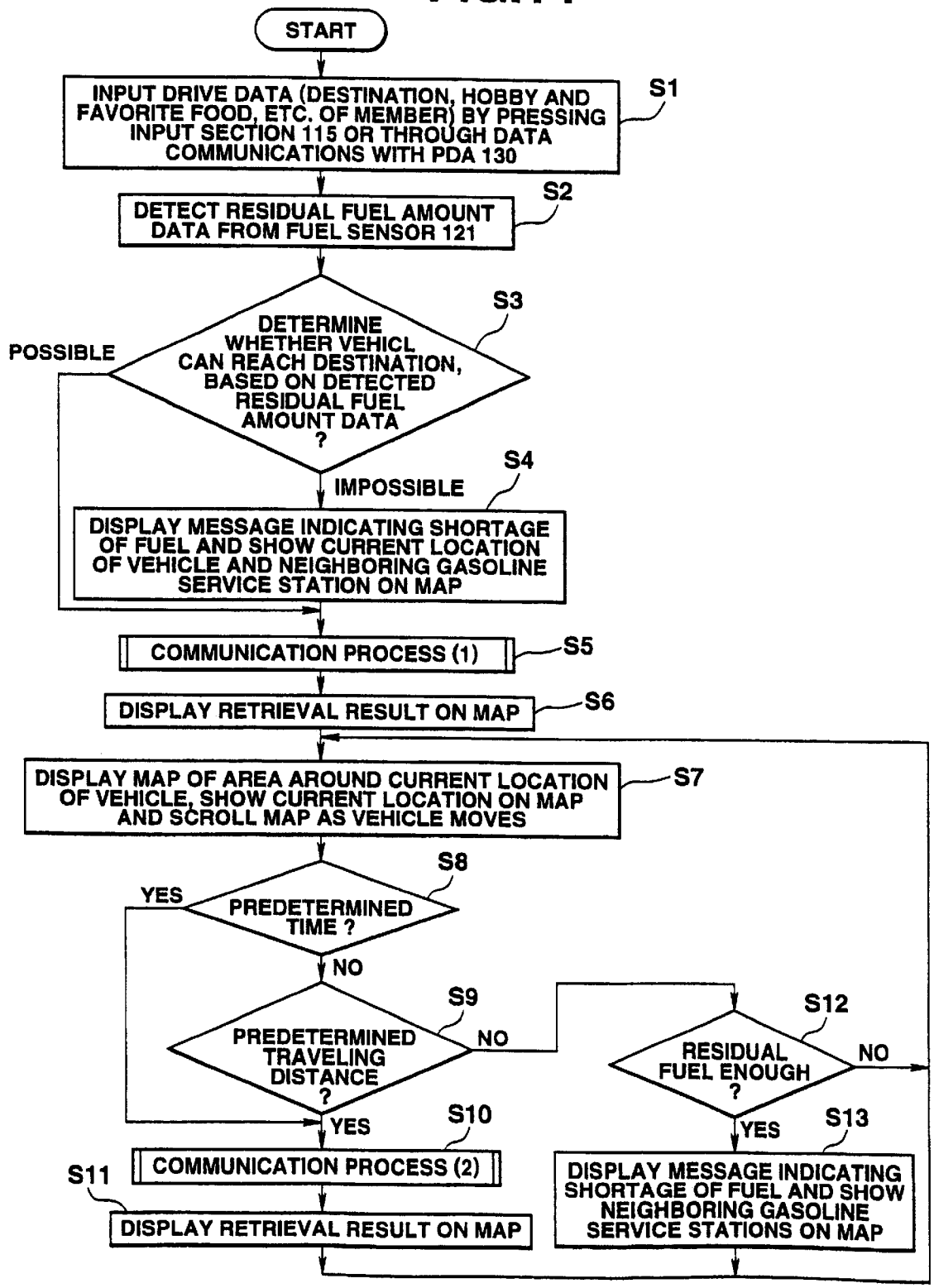
FIG. 14 is a flowchart explaining the operation of the car navigation apparatus supplied with information according to the second embodiment.

FIG. 14 is a flowchart explaining a process in which the car navigation 110 receives drive assistance information from the service center 140. FIG. 15 is a flowchart explaining a communication process (1) (step S5) shown in FIG. 14. FIG. 16 is a flowchart explaining a communication process (2) (step S10) shown in FIG. 14.

FIG. 17 exemplifies input drive data, while FIG. 18 exemplifies what the display 113a of the car navigation apparatus 110 displays.

In FIG. 14, the drive data shown in FIG. 17 (a date, a destination, the hobbies and favorite foods, etc. of a driver and any companion who are traveling on the same vehicle) is input to the car navigation apparatus 110 by pressing the input section 115 or through data communications with the PDA 130 (step S1).

Specifically, the date "11/3", the destination "Inawashiro", the hobby "painting" and the favorite food "Italian food" of companion Mr. C are input by pressing the input section 113. The input data is stored into the storage unit 117.

The input of the above-described data can be performed also from the PDA 130. In that case, the drive data can be created utilizing schedule data stored in the PDA 130 stores and data items which are associated with the companion (Mr. C) and which are contained in address notebook data stored in the PDA 130. The schedule data contains the scheduled date "11/3" and destination of a drive, while the address notebook data contains personal information such as the name, address, favorite food (Italian food) and hobby (painting), etc. of the companion. The drive data which the PDA 130 has created is sent to the car navigation apparatus 110 through the communication section 136. The received drive data is stored into the storage unit 117.

Figure 18A:
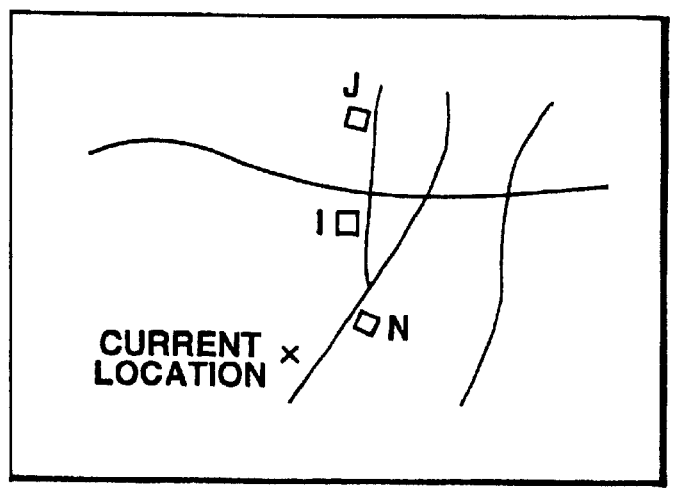
FIG. 18A–18B are diagrams exemplifying what the display of the car navigation apparatus supplied with information displays.

Next the CPU 111 detects residual fuel amount data from the fuel sensor 121 (step S2). Then, based on the residual fuel amount data detected in the step S2, the CPU 111 determines whether the vehicle can reach the destination (step S3). When the CPU 111 determines in the step S3 that the vehicle can reach the destination, it goes to step S5. When the CPU 111 determines in the step S3 that the vehicle cannot reach the designation, it goes to step S4. In the step S4, the CPU 111 retrieves information on any nearby gasoline service stations (GS) from the storage medium 117a, and shows them in their corresponding positions on the map displayed on the display 113a, together with the position of the vehicle, as illustrated in FIG. 18A. In FIG. 18A, gasoline service stations N, I and J are shown on the map.

The communication process (1) is executed in the step S5. This communication process (1) will now be described in detail with reference to the flowchart of FIG. 15.

Figure 15:
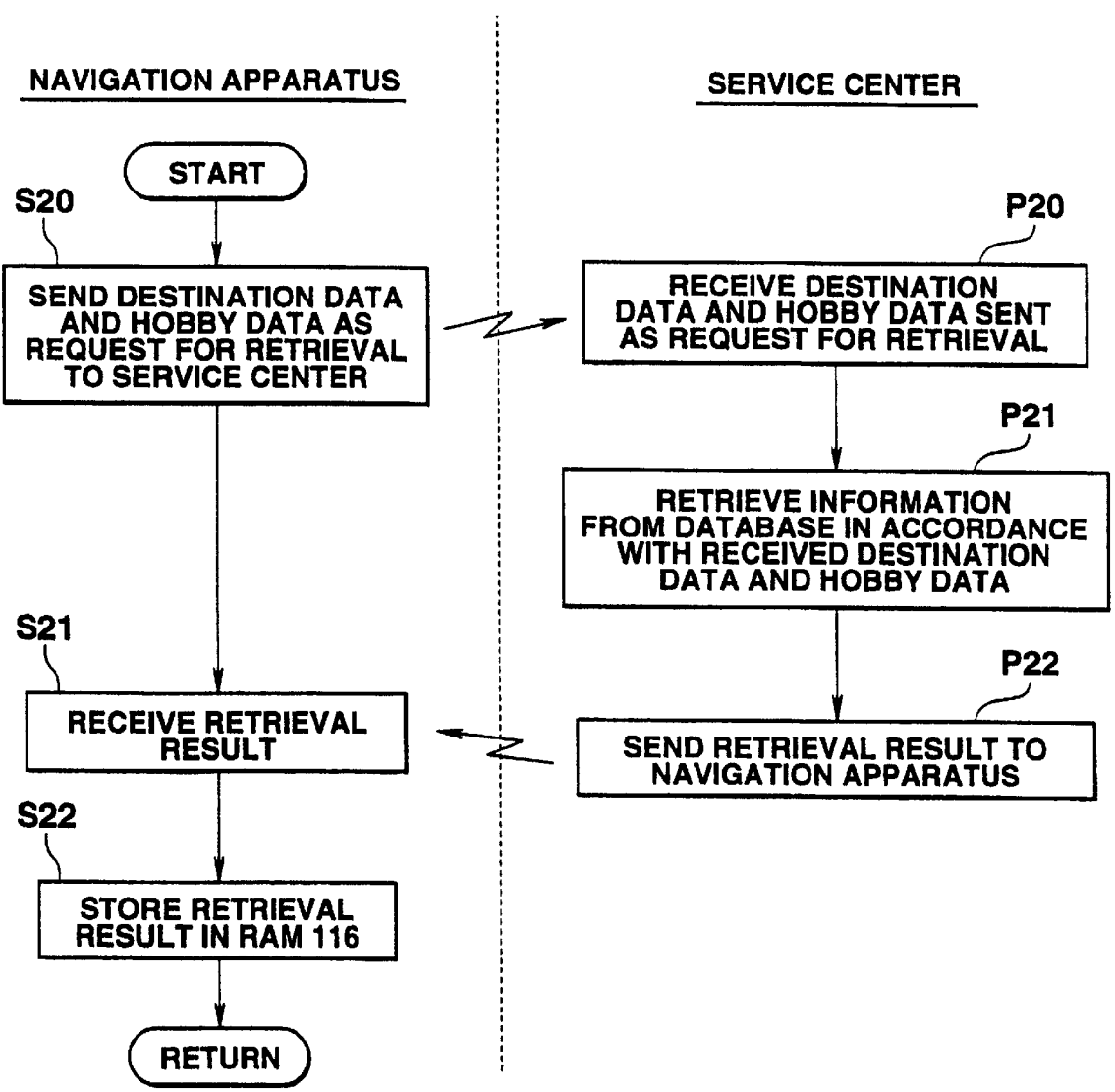
FIG. 15 is a flowchart explaining a process (1) for communications between the car navigation apparatus and the service center according to the second embodiment.

In FIG. 15, the car navigation apparatus 110 first sends the destination data and hobby data, input in the step S1, from the storage unit 117 to the service center 140 through the communication section 118 as a request for retrieval (step S20). For example, the car navigation apparatus 110 sends the destination data "Inawashiro" and the hobby data "painting" as a request for retrieval.

When the service center 140 receives the destination data and the hobby data from the car navigation apparatus 110 as a request for retrieval (step P20), the service center 140 retrieves information on any facility or the like which will suffice the hobby and which is located near the destination from the database 143 in accordance with the received data (step P21), and sends the retrieval result to the car navigation apparatus 110 which is the sender of the request for retrieval (step P22). For example, the service center 140 retrieves information on an art museum near Inawashiro from the database 143 in accordance with the destination data "Inawashiro" and the hobby data "painting", and sends the retrieved information to the car navigation apparatus 110.

When the car navigation apparatus 110 receives the retrieval result from the service center 140 (step S21), it stores the retrieval result in the RAM 116 (step S22), terminates the communication process (1) and goes to step S6 shown in FIG. 14.

Figure 18B:
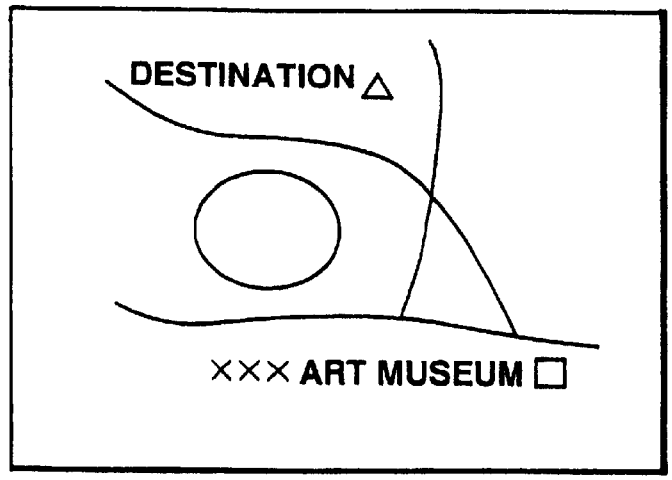

In the step S6, the CPU 111 extracts a group of map data including a spot (a facility or the like which will suffice the hobby and which is located near the destination) corresponding to the retrieval result from the storage medium 117a, and displays a map on the display 113a, as illustrated in FIG. 18B. Simultaneously, the CPU 111 shows the above-mentioned spot on the map in order to teach the driver and any other person in the vehicle that a facility or the like which will suffice the hobby is located near the destination. (In this case, if the car navigation apparatus 110 receives attendant information, for example, a history, an address, etc. of the facility or the like, the CPU 111 may show also the attendant information on the map.) In the example shown in FIG. 18B, an art museum is shown on the map in association with the hobby (painting).

Next the CPU 111 displays the map of an area around the current location of the vehicle on the display 113a, and shows marks or the like representing the current location and traveling direction of the vehicle on the map. As the vehicle moves, the CPU 111 scrolls the map in accordance with the movement of the vehicle. In order to realize this, the map data on the VRAM 113b is shifted, and other necessary map data is read out from the storage medium 117a and is developed on an empty area of the VRAM 113b (step S7).

While the vehicle is in motion, the car navigation apparatus 110 performs a general navigating display operation, and constantly checks time, the traveling distance and the amount of fuel. More specifically, the CPU 111 detects time data from the clock section 114, and determines whether a predetermined time which is, for example, lunch time (12:00), has come (step S8). When the CPU 111 determines in the step S8 that the predetermined time has come, it goes to step S10 in which the communication process (2) is executed. When the CPU 111 determines in the step S8 that the predetermined time has not yet come, the CPU 111 detects data output from the odometer 120, and determines whether the vehicle has traveled a predetermined distance which is 100 km, for example (step S9). When the CPU 111 determines in the step S9 that the vehicle has traveled the predetermined distance, it goes the step S10 in which the communication process (2) is performed. When the CPU 111 determines in the step S9 that the vehicle has not yet traveled the predetermined distance, the CPU 111 detects the residual fuel amount data from the fuel sensor 121, and determines whether the residual fuel is enough for the vehicle to reach the destination (step S12). When the CPU 111 determines in the step S12 that the residual fuel is enough, it returns to the step S7 and repeats a checking process.

When the CPU 111 determines in the step S12 that the residual fuel is not enough, it goes to step S13 and displays a message indicating the shortage of fuel, Simultaneously, the CPU 111 retrieves information on the gasoline service stations near the current location of the vehicle from the storage medium 117a, and shows the gasoline service stations (GS) in their corresponding positions on the displayed map. Then the CPU 111 returns to the step S7.

The step S10 in which the communication process (2) is executed will now be described in detail, with reference to the flowchart of FIG. 16.

When it is determined in the step S8 that the predetermined time (e.g. lunch time 12:00) has come, the car navigation apparatus 110 sends favorite food data, input in the step S1, to the service center 140 as a request for retrieval (step S30).

When the service center 140 receives the favorite food data from the car navigation apparatus 110 as the request for retrieval (step P30), the service center 140 retrieves information on any restaurant or the like which serves the favorite food and which is present near the current location from the database 143 (step P31), and sends the retrieval result to the service center 140 in reply (step P32). In the case of Mr. C, his favorite food is Italian food, and accordingly the service center 140 retrieves information on any Italian restaurant near the current location from the database 143, and sends the retrieved information to the car navigation apparatus 110.

When the car navigation apparatus 110 receives the retrieval result from the service center 140 (step S31), the car navigation apparatus 110 stores the retrieval result in the RAM 116 (step S32), terminates the communication process (2) and goes to the step S11 shown in FIG. 14.

Figure 18C:
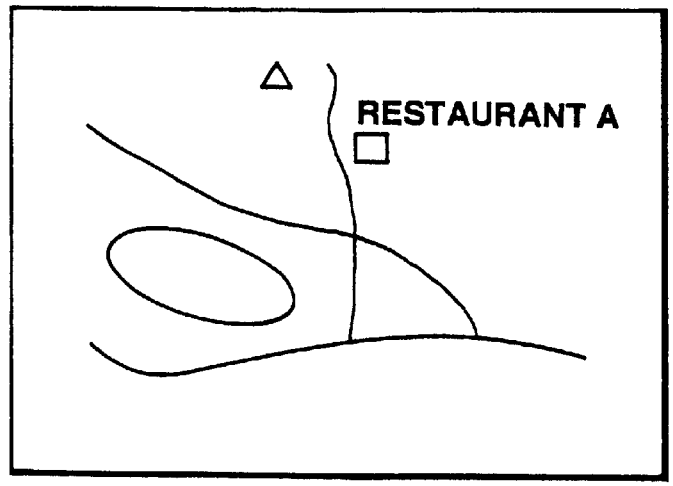

In the step S11, as illustrated in FIG. 18C, a restaurant which serves the favorite food of the driver or any other person in the vehicle and which is present near the current location of the vehicle is shown in its corresponding position on the map displayed on the display 113a, in order to teach the driver and so on that such a restaurant is present near the current location. Thus, any place which serves the favorite food of the driver or any other person can be automatically displayed at lunch time, etc. so that the drive becomes pleasant. In this case, restaurant A attendant information (e.g. a menu, a recommendable cuisine, and the like) can also be displayed if received. In FIG. 18C, an Italian restaurant is shown in association with the favorite food (Italian food).

Next the flow of processing goes to the step S7, and the above-described steps are repeated.

When the communication process (2) is performed in the step S10 after it is determined in the step S9 that the vehicle has traveled the predetermined distance, the driver and any other person in the vehicle may be tired due to a drive over a long period of time. In consideration of this, a request for performing a retrieval in association with a rest house or the like can be sent to the service center 140, and the result of the retrieval performed in association with the rest house or the like can be acquired from the service center 140 in the communication process (2).

The flowcharts shown in the accompanying drawings are examples, and changes and modifications can be made without departing from the scope of the present invention.

In the second embodiment, the car navigation apparatus 110 communicates with the service center 140. However, the PDA 130 can perform data communications with the service center 140. In this case, the PDA 130 may send the service center 140 a request for performing a retrieval in association with the drive data, receive the retrieval result from the service center 140, and send the retrieval result to the car navigation apparatus 110.

What is claimed is:

1. An information serving system comprising a mobile apparatus and a terminal apparatus, wherein:
   (i) said mobile apparatus includes:
      a memory which stores ticket information including departure time data; and
      a display which displays various information,
   (ii) said terminal apparatus is installed in a building, and includes:
      a communication device which communicates data with said mobile apparatus;
      a database which stores map information representing a location of a facility, and usable facility information regarding a usable facility; and
      a controller which: (a) controls said communication device to read the ticket information stored in said memory of said mobile apparatus, (b) calculates a time interval between a current time and a departure time represented by the departure time data, (c) retrieves the usable facility information from said database in accordance with a length of the time interval, and (d) causes said communication device to transmit to said mobile apparatus the retrieved usable facility information together with the map information representing the location of the facility indicated by the retrieved usable facility information; and
   (iii) said mobile apparatus controls said display thereof to display the transmitted usable facility information on a map based on the transmitted map information.

2. The information serving system according to claim 1, wherein:
   the ticket information includes departure time data;
   said terminal apparatus is adapted to be installed in a station;
   said map information includes station map information;
   said usable facility information includes information regarding a usable facility in the station;
   said controller: (a) controls said communication device to read the ticket information stored in said memory of said mobile apparatus, (b) retrieves the usable facility information from said database in accordance with a time duration obtained based on the current time and a departure time represented by the departure time data included in the ticket information, and (c) causes said communication device to transmit to said mobile apparatus the retrieved usable facility information together with the station map information; and
   said mobile apparatus controls said display thereof to display the transmitted usable facility information on a map of the station based on the transmitted station map information.

3. The information serving system according to claim 2, wherein:
   the ticket information includes information specifying a seat on a train; and
   said terminal apparatus transmits to said mobile apparatus information indicating a position to board the train from a door nearest to the seat.

4. The information serving system according to claim 2, wherein:
   said mobile apparatus stores information regarding a user's preferences; and
   said terminal apparatus reads the information regarding the user's preferences, retrieves the usable facility information from said database based on the user's preferences, and transmits the retrieved usable facility information to said mobile apparatus.

5. The information serving system according to claim 2, wherein:
   said mobile apparatus stores information regarding a user's age; and
   said terminal apparatus reads the information regarding the user's age, retrieves the usable facility information from said database based on the user's age, and transmits the retrieved usable facility information to said mobile apparatus.

6. The information serving system according to claim 2, wherein:
   said terminal apparatus is installed beside a plurality of ticket gates in the station, determines a current location of said mobile apparatus in the station based on communicability with said mobile apparatus, and transmits information representing a current location of said mobile apparatus to said mobile apparatus; and
   said mobile apparatus controls said display thereof to display the current location of said mobile apparatus on the map of the station based on the information representing the current location transmitted from said terminal apparatus.

7. The information serving system according to claim 2, wherein said terminal apparatus includes an open/close controller which controls opening/closing of a gate through which a user of said mobile apparatus passes, based on the ticket information read from said mobile apparatus.

8. An information serving apparatus comprising:
   a communication device adapted to communicate data with a mobile apparatus that includes a memory for storing ticket information including time data;
   a database which stores map information representing a location of a facility, and usable facility information regarding a usable facility; and
   a controller which: (a) controls said communication device to read the ticket information stored in said memory of said mobile apparatus, (b) retrieves the usable facility information from said database in accordance with a time duration obtained based on a current time and a time represented by the time data included in the ticket information, and (c) causes said communication device to transmit to said mobile apparatus the retrieved usable facility information together with the map information representing the location of the facility indicated by the retrieved usable facility information.

9. The information serving apparatus according to claim 8, wherein:
   the apparatus is adapted to be installed in a station;
   the ticket information includes departure time data;
   said map information includes station map information;

said usable facility information includes information regarding a usable facility in the station; and said controller: (a) controls said communication device to read the ticket information stored in said memory of said mobile apparatus, (b) retrieves the usable facility information from said database in accordance with a time duration obtained based on the current time and a departure time represented by the departure time data included in the ticket information, and (c) causes said communication device to transmit to said mobile apparatus the retrieved usable facility information together with the station map information, in order to enable said mobile apparatus to display the usable facility information on a map of the station.

10. The information serving apparatus according to claim 9, wherein:

the ticket information includes information specifying a seat on a train; and said controller causes said communication device to transmit to said mobile apparatus information indicating a position to board the train from a door nearest to the seat.

11. The information serving apparatus according to claim 9, wherein said controller is adapted to receive information regarding a user's preferences, retrieve the usable facility information based on the user's preferences, and to cause said communication device to transmit the retrieved usable facility information to said mobile apparatus.

12. The information serving apparatus according to claim 9, wherein said controller is adapted to receive information regarding a user's age, retrieve the usable facility information based on the user's age, and to cause said communication device to transmit the retrieved usable facility information to said mobile apparatus.

13. The information serving apparatus according to claim 9, wherein:

said apparatus is installed beside a plurality of ticket gates in the station;

said controller determines a current location of said mobile apparatus in the station based on communicability with said mobile apparatus; and controls said communication device to transmit information representing a current location of said mobile apparatus to said mobile apparatus, in order to enable said mobile apparatus to display the current location on the map of the station.

14. The information serving apparatus according to claim 9, further comprising an open/close controller which controls opening/closing of a gate through which a user of said mobile apparatus passes, based on the ticket information read from said mobile apparatus.

* * * * *

UNITED STATES PATENT AND TRADEMARK OFFICE
CERTIFICATE OF CORRECTION

PATENT NO.       : 6,473,790 B1                                                                 Page 1 of 1
APPLICATION NO.  : 09/155001
DATED            : October 29, 2002
INVENTOR(S)      : Minoru Tagi It is certified that error appears in the above-identified patent and that said Letters Patent is hereby corrected as shown below:

Column 17, line 45 (Claim 2, line 3), delete "the ticket information includes departure time data;".

Column 17, lines 52-61 (Claim 2, lines 9-18), delete "said controller: (a) controls said communication device to...with the station map information;".

Column 18, line 46 (Claim 8, line 4), insert --departure-- between "including" and "time".

Column 18, line 52 (Claim 8, line 10), after "memory of said mobile apparatus," insert --(b) calculates a time interval between a current time and a departure time represented by the departure time data,--.

Column 18, lines 52-56 (Claim 8, lines 10-14), after "memory of said mobile apparatus," replace "(b) retrieves the...in the ticket information, and" with --(c) retrieves the usable facility information from said database in accordance with a length of time interval, and--.

Column 18, line 56, (Claim 8, line 14), replace "(c)" with --(d)--.

Column 18, line 65 (Claim 9, line 4), delete "the ticket information includes departure time data".

Column 19, line 2 (Claim 9), after "regarding a usable facility in the station" replace ";" with --.--.

Column 19, lines 2-14 (Claim 9), delete "and said controller: (a) controls said communication device to...information on a map of the station".

Signed and Sealed this

Twentieth Day of July, 2010

David J. Kappos
*Director of the United States Patent and Trademark Office*